A. R. TULLY.

Wagon-Tops.

No. 5,467. Reissued June 24, 1873.

Witnesses:
W. C. Dieterich
C. Edquist

Inventor:
A. R. Tully
Per Munn & Co.
Attorneys.

AM. PHOTO-LITHOGRAPHIC CO. N.Y. (OSBORNE'S PROCESS.)

UNITED STATES PATENT OFFICE.

ANDREW R. TULLY, OF HARLEM, NEW YORK.

IMPROVEMENT IN WAGON-TOPS.

Specification forming part of Letters Patent No. 58,001, dated September 11, 1866; reissue No. 5,467, dated June 24, 1873; application filed February 15, 1873.

*To all whom it may concern:*

Figure 1:
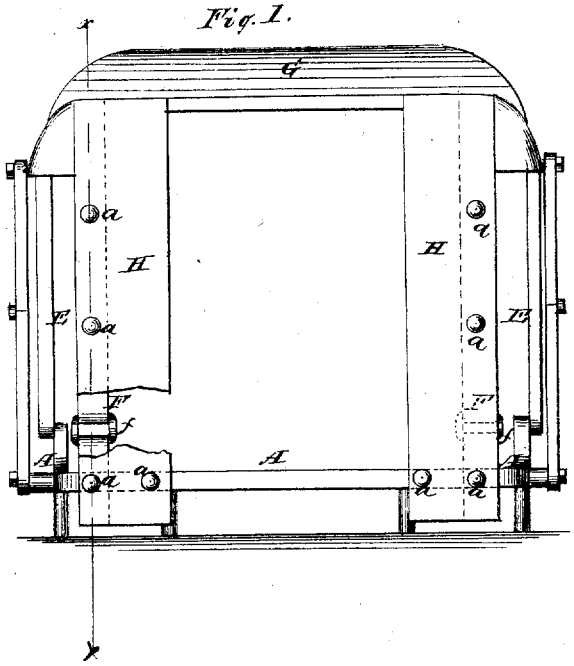
Figure 2:
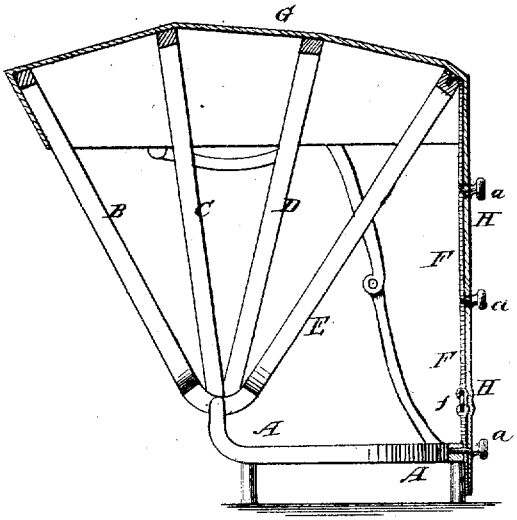
Figure 3:
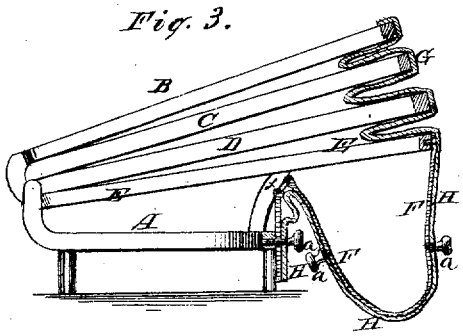

Be it known that I, ANDREW R. TULLY, of Harlem, in the county and State of New York, have invented a new and useful Improvement in Wagon-Tops, of which the following is a specification:

Figure 1 represents a rear view of my improved wagon-top. Fig. 2 represents a vertical longitudinal section taken on a plane indicated by line *x x*, Fig. 1. Fig. 3 represents the same section as Fig. 2, the top being let down.

Similar letters of reference indicate corresponding parts.

This invention has for its object the construction of a wagon-top in such a manner that the back or rear part of the same shall be effectually prevented from being drawn forward; that, also, the leather covering shall always remain smooth and not be permitted to shrink; and, lastly, that the knobs or buttons, which are attached to the rear straps, and which serve to hold the side curtains, shall be fastened to the said rear straps in such manner that they will effectually be prevented from becoming loose again; and my invention consists in attaching to either side of the rear end of the wagon-frame a very fine but broad metallic spring-stay, which is attached and securely riveted at its upper end to the rear bow, thus tending to keep and effectually preventing the said rear bow from being drawn forward by the shrinking of the leather cover; and also preventing said leather cover from creasing and crumpling, thus always having a smooth cover even after it has been used for years. This metallic spring-stay must be fine enough to allow the cover to be folded down, and may be provided with a hinge about two inches above the wagon-frame to aid it in thus being folded down; and my invention further consists in riveting or screwing, or otherwise attaching, to the said spring-stay the knobs or buttons to which the side curtains are hung, so that said knobs may be firmly and securely held.

The old manner of holding the back bow of a wagon-top to the rear frame of the wagon consisted in the application of a strap of strong linen or canvas, which soon became stretched by constant use, and allowed the back bow to fall forward, aided by the unequal shrinking of the leather cover, the effect of which was that such wagon-tops offered a rugged folded surface between the rear bow and the one in front of it; and the knobs or buttons aforementioned could never be effectually attached to said strap of canvas, and soon became loose and tore off easily.

To the wagon-frame A, to which the four bows, B, C, D, and E, are attached in the usual manner, is riveted or otherwise secured, at each side of its rear end, a spring, F, made of brass or other metal, brass being preferred on account of its not rusting; but the spring-stay may be made of any suitable kind of metal, and in any suitable form.

The upper end of this spring-stay F is laid over, and riveted or screwed to the rear bow E, as shown in Fig. 2, and thus said rear bow is held down and prevented effectually from going forward, and the leather covering G is thus also prevented from shrinking.

The springs must be fine enough to allow the cover to be folded down, in which case they will assume the shape indicated in Fig. 3; and they are aided in thus folding down by being disconnected from and hinged to their lower part by the hinge *f*, which may be applied about two inches above the wagon-frame.

The knobs or buttons *a*, to which the side curtains are fastened, are riveted or screwed to the springs in the manner shown in Fig. 2, and are thus held firmly.

The bottom knobs may act at the same time as rivets or screws for attaching the springs F to the wagon-frame; as also these knobs are made use of to fasten the usual leather straps H to the springs F.

Having thus described my invention, I claim as new and desire to secure by Letters Patent—

1. In combination with the cover of a folding carriage-top, metallic plate or ribbon spring-stays, arranged to stretch the cover and fold therewith, substantially as shown and described.

2. The knobs *a*, connected to the metal strap or stay concealed beneath the leather strap H, substantially as shown, and for the purpose specified.

ANDREW R. TULLY.

Witnesses:

C. SEDGWICK,

T. B. MOSHER.